(12) United States Patent
Yamashita et al.

(10) Patent No.: US 10,787,127 B2
(45) Date of Patent: Sep. 29, 2020

(54) DISPLAY SYSTEM FOR WORK VEHICLE

(71) Applicants: The University of Tokyo, Tokyo (JP); KOMATSU LTD., Tokyo (JP)

(72) Inventors: Atsushi Yamashita, Tokyo (JP); Hajime Asama, Tokyo (JP); Hiromitsu Fujii, Tokyo (JP); Wei Sun, Tokyo (JP); Takashi Tsukamoto, Tokyo (JP); Kazuki Kure, Tokyo (JP)

(73) Assignees: THE UNIVERSITY OF TOKYO, Tokyo (JP); KOMATSU LTD., Tokyo (JP)

( * ) Notice: Subject to any disclaimer, the term of this patent is extended or adjusted under 35 U.S.C. 154(b) by 39 days.

(21) Appl. No.: 15/699,175

(22) Filed: Sep. 8, 2017

(65) Prior Publication Data
US 2018/0079361 A1    Mar. 22, 2018

(30) Foreign Application Priority Data
Sep. 20, 2016 (JP) .................. 2016-183144

(51) Int. Cl.
*H04N 5/00* (2011.01)
*B60R 1/00* (2006.01)
(Continued)

(52) U.S. Cl.
CPC ................ *B60R 1/002* (2013.01); *B60R 1/00* (2013.01); *E02F 9/261* (2013.01);
(Continued)

(58) Field of Classification Search
CPC ............. B60R 1/002; B60R 2300/607; B60R 2300/105; B60R 1/00; B60R 1/23238;
(Continued)

(56) References Cited

U.S. PATENT DOCUMENTS 9,648,346 B2 * 5/2017 Zhang .................. H04N 19/597
2011/0234802 A1 * 9/2011 Yamada .................... B60R 1/00
348/148
(Continued)

FOREIGN PATENT DOCUMENTS

WO       2016/031009 A1     3/2016
WO   WO-2017094626 A1 *  6/2017  .............. E02F 9/261

OTHER PUBLICATIONS

Examination report No. 1 for the corresponding Australian application No. 2017225147, dated Aug. 16, 2018.

*Primary Examiner* — Zhihan Zhou
(74) *Attorney, Agent, or Firm* — Global IP Counselors, LLP

(57) ABSTRACT

A display system includes a work vehicle, a first camera, a computation device, and a display device. The first camera is attached to one side portion of the work vehicle. The first camera has an optical axis inclined downward with respect to a horizontal direction. The first camera captures a first image including a surrounding environment of the work vehicle and a first vehicle body portion. The computation device generates a display image from the first image. The display image includes a surrounding image that depicts the surrounding environment of the work vehicle in a bird's-eye view, and a vehicle image. The vehicle image may combine a vehicle model depicted in the work vehicle and an image of the first vehicle body portion captured by the first camera, or may be an image of the first vehicle body portion. The display device displays the display image.

16 Claims, 18 Drawing Sheets

(51) Int. Cl.
*H04N 7/18* (2006.01)
*H04N 5/232* (2006.01)
*E02F 9/26* (2006.01)
*H04N 5/247* (2006.01)
*H04N 5/262* (2006.01)
*H04N 5/265* (2006.01)

(52) U.S. Cl.
CPC ......... *H04N 5/23238* (2013.01); *H04N 5/247* (2013.01); *H04N 7/18* (2013.01); *H04N 7/181* (2013.01); *B60R 2300/105* (2013.01); *B60R 2300/607* (2013.01); *E02F 9/264* (2013.01); *H04N 5/265* (2013.01); *H04N 5/2624* (2013.01)

(58) Field of Classification Search
CPC ...... H04N 5/265; H04N 5/2624; H04N 5/247; H04N 7/18; H04N 7/181; H04N 5/23238; E02F 9/264; E02F 9/261
See application file for complete search history.

(56) References Cited

U.S. PATENT DOCUMENTS

| | | | |
|---|---|---|---|
| 2012/0281873 A1* | 11/2012 | Brown | G06T 19/006 382/103 |
| 2013/0033494 A1* | 2/2013 | Kiyota | B60R 1/00 345/420 |
| 2013/0182066 A1* | 7/2013 | Ishimoto | H04N 7/181 348/38 |
| 2014/0088824 A1* | 3/2014 | Ishimoto | E02F 9/0841 701/34.4 |
| 2014/0240502 A1* | 8/2014 | Strauss | B60W 30/06 348/148 |
| 2016/0035110 A1* | 2/2016 | Kiyota | B60R 1/00 348/148 |
| 2016/0200252 A1* | 7/2016 | Oota | G06K 9/00805 701/50 |
| 2016/0217331 A1* | 7/2016 | Kowatari | E02F 9/261 |
| 2016/0353019 A1* | 12/2016 | Kodama | G06T 3/4038 |
| 2017/0050566 A1 | 2/2017 | Yamashita et al. | |
| 2018/0258616 A1* | 9/2018 | Kiyota | G06T 1/20 |

* cited by examiner

DISPLAY SYSTEM FOR WORK VEHICLE

CROSS-REFERENCE TO RELATED APPLICATIONS

This application claims priority to Japanese Patent Application No. 2016-183144 filed on Sep. 20, 2016, the disclosure of which is hereby incorporated herein by reference in its entirety.

BACKGROUND

Field of the Invention

The present invention relates to a display system for a work vehicle.

Description of the Related Art

A display system is well known that generates a display image depicting a bird's-eye view of the surrounding environment of a work vehicle with images captured by a plurality of cameras attached to the work vehicle. For example, in the display system described in International Publication No. WO 2016/031009 A1, cameras are attached to portions on the front and back and left and right of a vehicle body of a work vehicle. The images captured by the cameras are combined in a hemispherical model centered on the position of the work vehicle, thereby generating a display image depicting a bird's-eye view of the surrounding environment. Moreover, a model of the work vehicle previously generated from CAD data and the like is disposed in the center of the display image.

SUMMARY

Because the cameras are attached to the vehicle body in the above system, the vehicle body cannot be imaged. Alternatively, even if the vehicle body can be imaged, only a small portion of the vehicle body at the edge of the field of view is seen. As a result, a previously created vehicle model is displayed as the work vehicle in the display image instead of the images imaged by the cameras.

However, it is difficult to understand the actual working conditions of the work vehicle in the display image described above. For example, a track-slippage condition cannot be understood from the display image for a work vehicle provided with a crawler belt travel device. Alternatively, the ground condition where the travel device is in contact cannot be understood from the display image. Furthermore, a location where a person can sit may be provided in a portion other than the operating cab (e.g., a side part of the vehicle body) on a work vehicle. It would be difficult to understand whether a person is present in such a location from the display image.

An object of the present invention is to provide a display system in which it is possible to understand conditions of the work vehicle itself as well as the surrounding environment of the work vehicle from a display image.

A display system for a work vehicle according to a first aspect of the present invention includes a work vehicle, a first camera, a computation device, and a display device. The first camera is attached to one side portion of the work vehicle. The optical axis of the first camera is inclined downward with respect to the horizontal direction. The first camera captures a first image that includes a first vehicle body portion that indicates at least a portion of the work vehicle, and a surrounding environment of the work vehicle. The computation device generates a display image including a surrounding image and a vehicle image from the first image captured by the first camera. The surrounding image depicts the surrounding environment of the work vehicle in a bird's-eye view manner. The vehicle image is an image that combines an image of the first vehicle body portion captured by the first camera with a vehicle model which represents the work vehicle. The display device displays the display image.

In the display system for the work vehicle according to the present aspect, the display image which includes the surrounding image which depicts the surrounding environment of the work vehicle in a bird's-eye view manner is generated from the first image captured by the first camera. As a result, the surrounding environment of the work vehicle can be easily understood from the display image. The optical axis of the first camera is inclined downward with respect to the horizontal direction. As a result, an image in which the first vehicle body portion of the work vehicle is clearly seen can be captured by the first camera. The vehicle image with which the image of the first vehicle body portion is combined is displayed by the display image. As a result, the condition of the work vehicle can be easily understood from the display image.

A display system for a work vehicle according to another aspect of the present invention includes a work vehicle, a first camera, a computation device, and a display device. The first camera is attached to one side portion of the work vehicle, the optical axis is inclined downward with respect to the horizontal direction, and the first camera captures a first image which includes a surrounding environment of the work vehicle and a first vehicle body portion that indicates at least a portion of the work vehicle. The computation device generates a display image including a surrounding image and a vehicle image from the first image captured by the first camera. The surrounding image depicts the surrounding environment of the work vehicle in a bird's-eye view manner. The vehicle image is an image of the first vehicle body portion. The display device displays the display image.

DETAILED DESCRIPTION OF EMBODIMENT(S)

Figure 1:
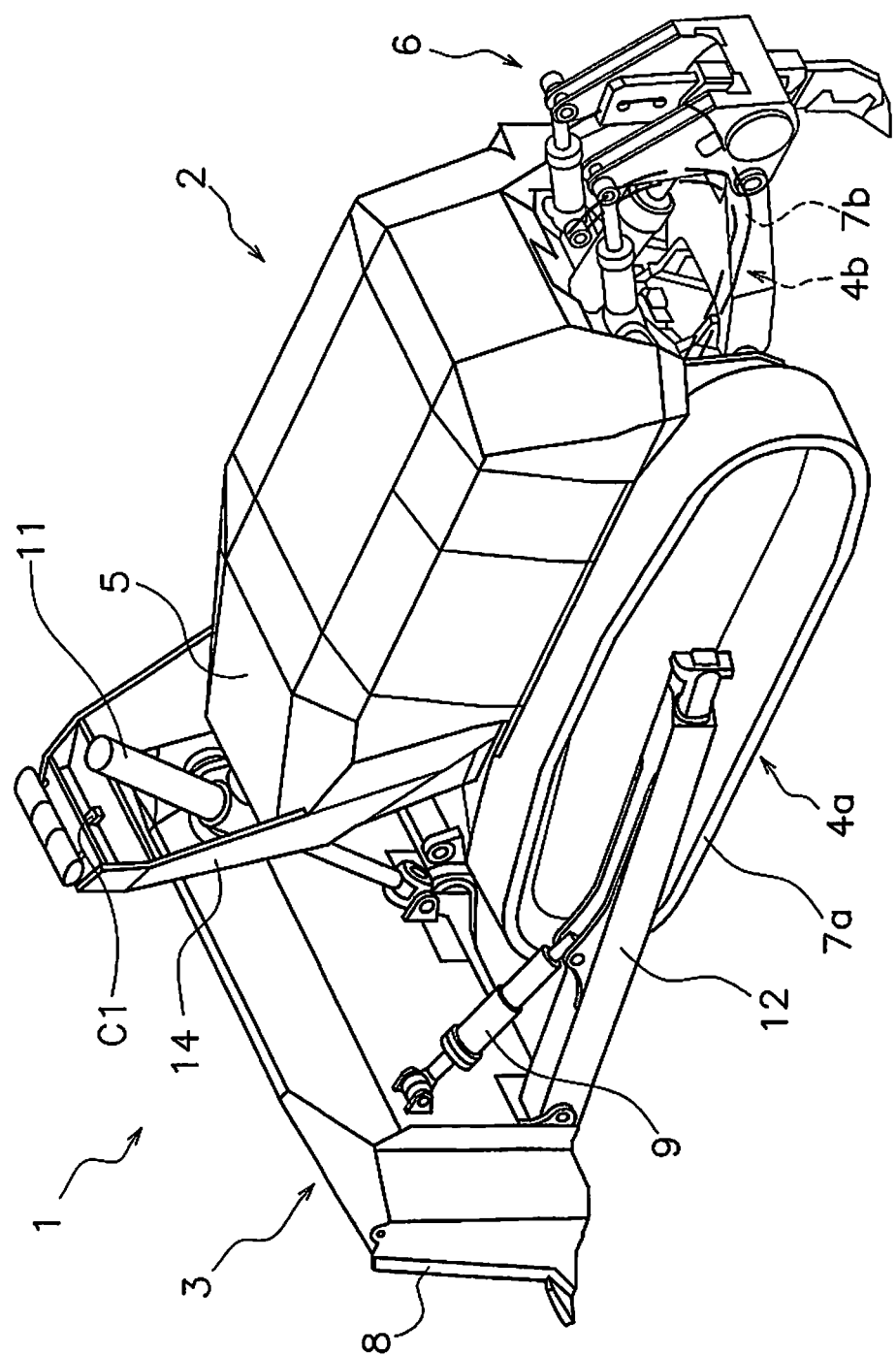
FIG. 1 is a perspective view of a work vehicle according to an embodiment.

The following is a description of a display system for a work vehicle according to the present embodiment with reference to the drawings. The display system according to the present embodiment is a system for displaying the surrounding environment of a work vehicle 1 as illustrated in FIG. 1. The work vehicle 1 is a bulldozer according to the present embodiment. The work vehicle 1 includes a vehicle body 2 and a work implement 3. The vehicle body 2 includes left and right travel devices 4a and 4b.

The vehicle body 2 is supported by the travel devices 4a and 4b. The vehicle body 2 includes the engine compartment 5. An engine and a driving device such as a hydraulic pump and the like, which are not included in the figures, are disposed inside the engine compartment 5. A ripper device 6 is attached to a rear portion of the vehicle body 2.

The left and right travel devices 4a and 4b are devices for causing the work vehicle 1 to travel. The left and right travel devices 4a and 4b respectively have crawler belts 7a and 7b. The work vehicle 1 travels due to the crawler belts 7a and 7b being driven.

The work implement 3 is disposed in front of the vehicle body 2. The work implement 3 is used for work such as excavating, transporting, or ground leveling. The work implement 3 includes a blade 8, tilt cylinders 9 and 10 (see FIG. 4), a lift cylinder 11, and arms 12 and 13 (see FIG. 4). The blade 8 is supported on the vehicle body 2 by the arms 12 and 13. The blade 8 is provided in a manner that allows for swinging in the up-down direction. The tilt cylinders 9 and 10 and the lift cylinder 11 change the orientation of the blade 8.

Figure 3:
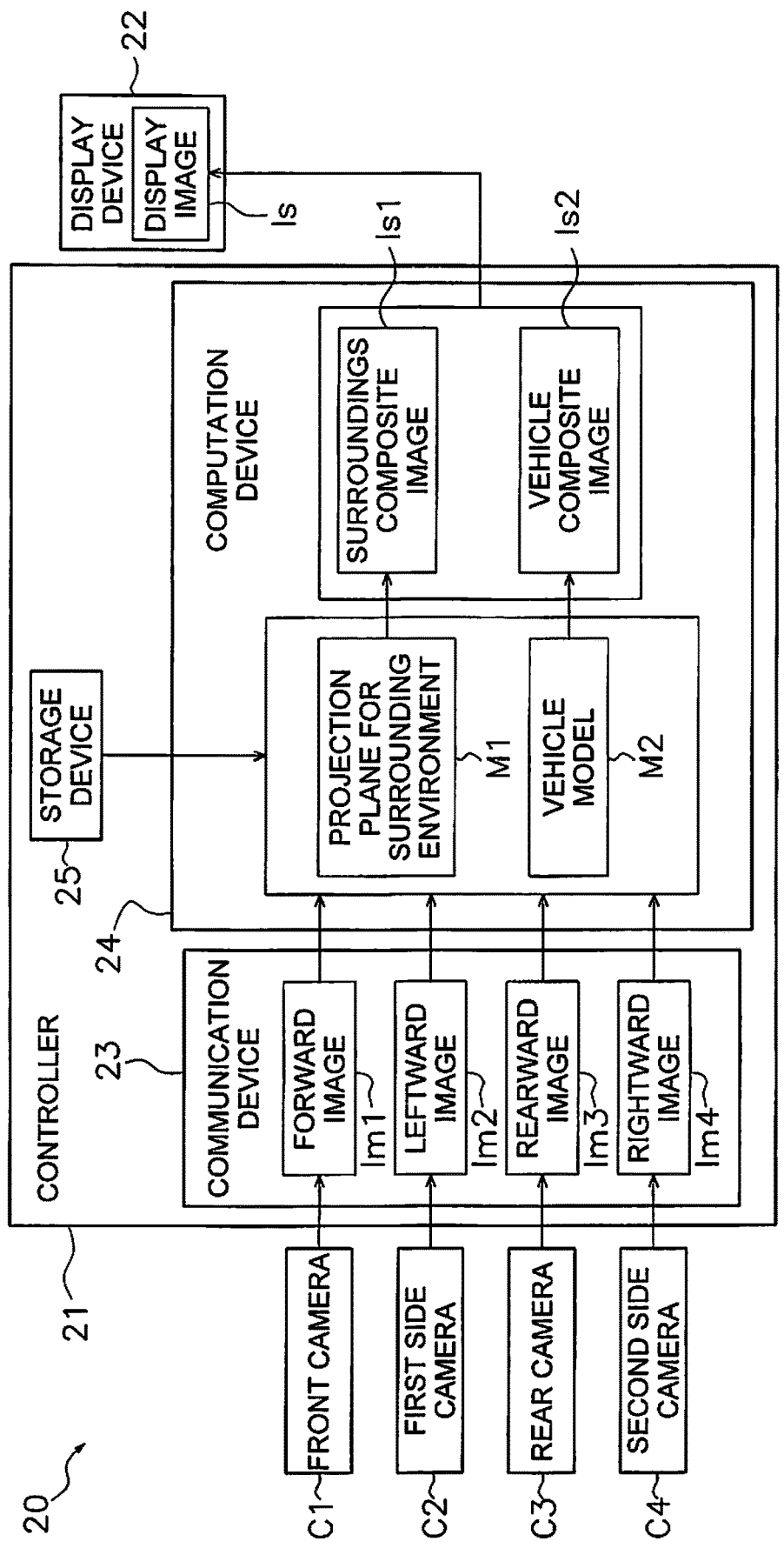
FIG. 3 is a block diagram illustrating a configuration of a display system according to an embodiment and illustrating a processing flow by the display system.

FIG. 3 is a block diagram illustrating a configuration of a display system 20 provided in the work vehicle 1 and a processing flow of the display system 20. As illustrated in FIG. 3, the display system 20 includes a plurality of cameras C1 to C4. The plurality of cameras C1 to C4 are attached to the vehicle body 2. The plurality of cameras C1 to C4 are fish-eye lens cameras. The angle of view of each of the plurality of cameras C1 to C4 is 180 degrees. However, the angle of view of each of the plurality of cameras C1 to C4 may be less than 180 degrees. Alternatively, the angle of view of each of the plurality of cameras C1 to C4 may be greater than 180 degrees. The plurality of cameras C1 to C4 includes a front camera C1, a first side camera C2, rear camera C3, and a second side camera C4.

Figure 2:
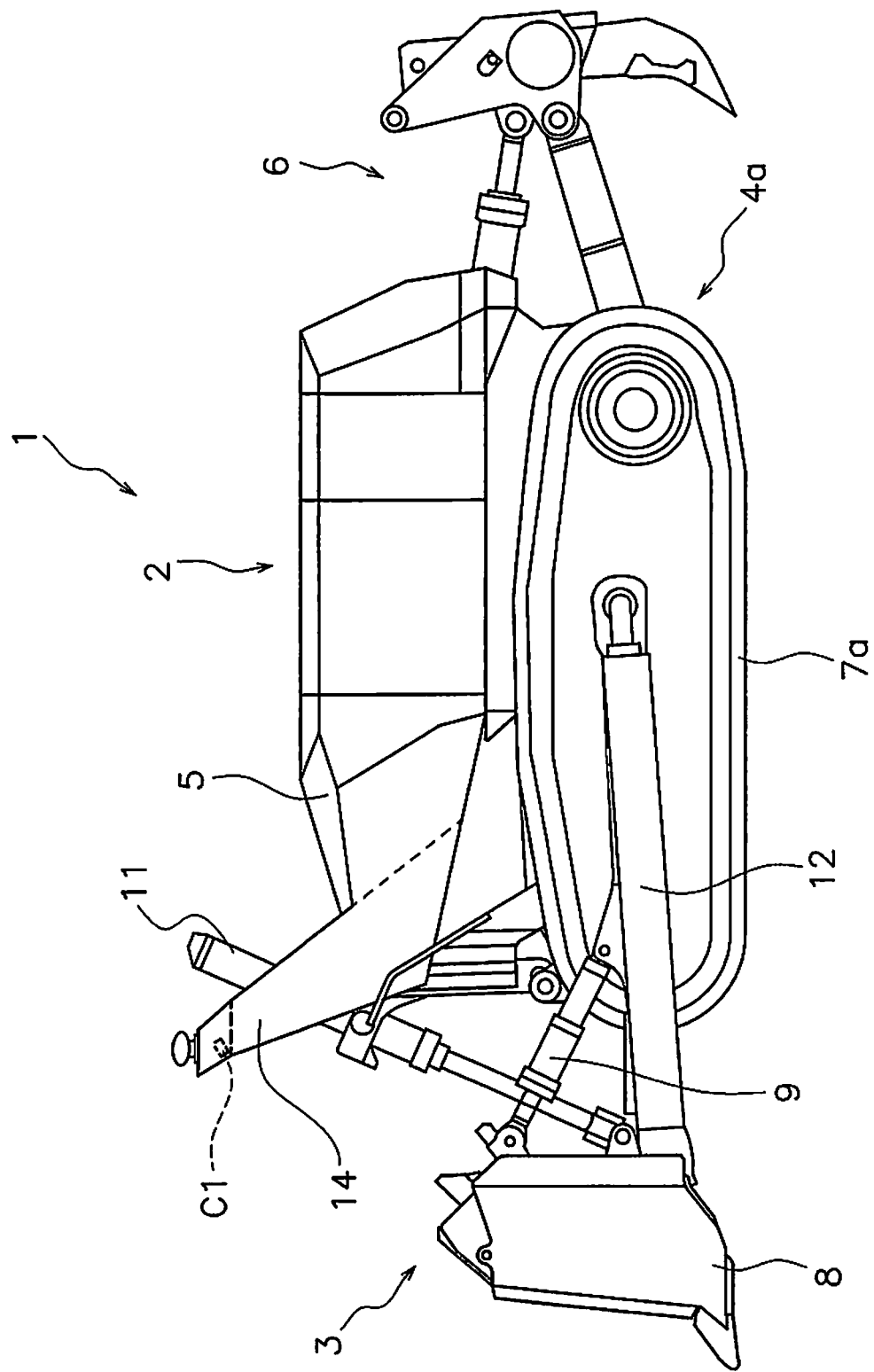
FIG. 2 is a side view of the work vehicle according to the embodiment.
Figure 4:
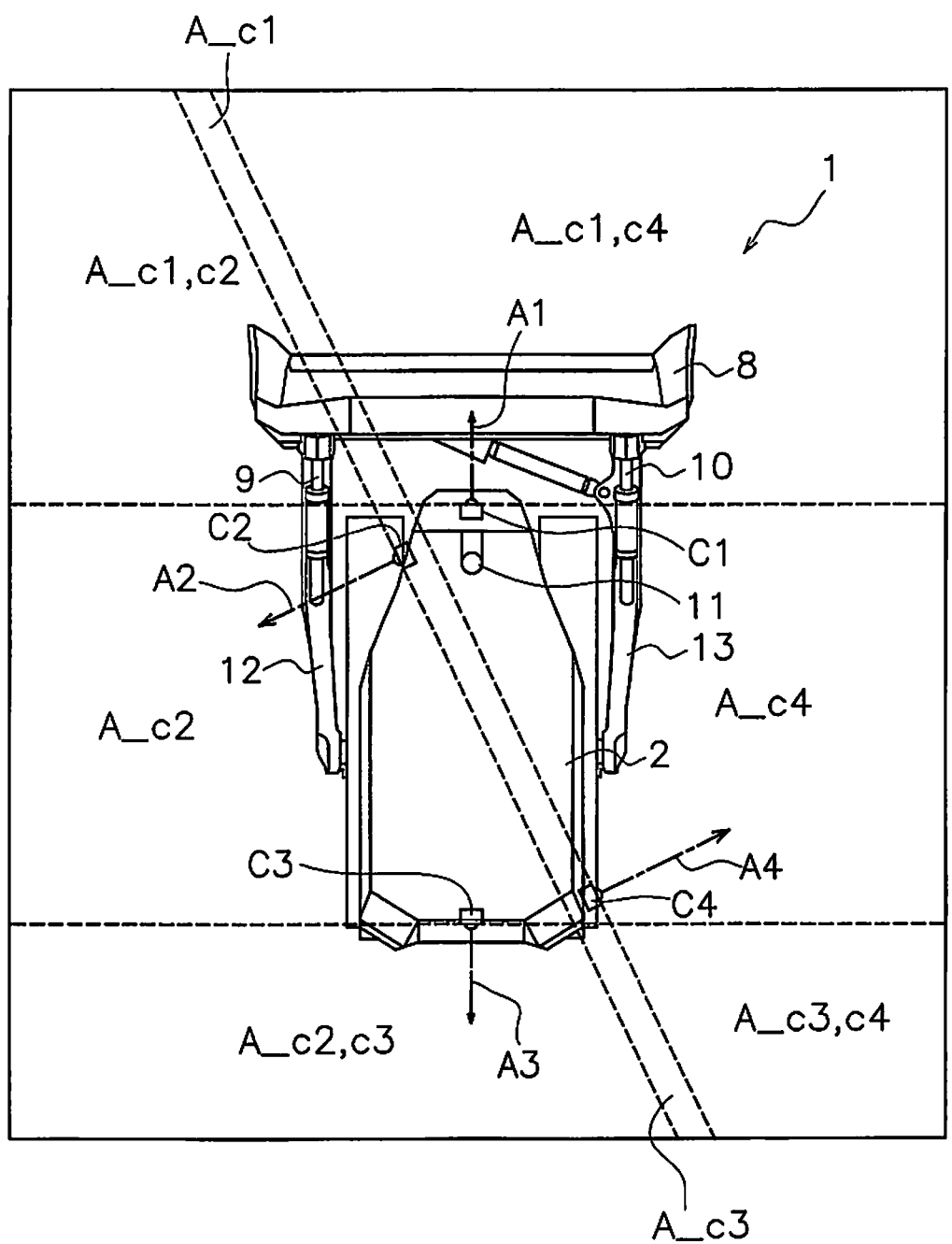
FIG. 4 is a plan view indicating the fields of view and the dispositions of cameras on the work vehicle according to a first embodiment.

FIG. 4 is a plan view indicating the fields of view and the dispositions of cameras on the work vehicle according to a first embodiment. As illustrated in FIG. 4, the front camera C1 is attached to a front portion of the vehicle body 2. The front camera C1 images toward the front of the vehicle body 2 and captures images including the surrounding environment of the work vehicle 1. Specifically, the vehicle body 2 includes a front camera support portion 14 as illustrated in FIGS. 1 and 2. The front camera support portion 14 extends upward from the front portion of the vehicle body 2. The front camera C1 is attached to the front camera support portion 14. The optical axis of the front camera C1 is oriented toward the front as indicated by arrow A1 in FIG. 4.

As illustrated in FIG. 4, the rear camera C3 is attached to a rear portion of the vehicle body 2. The rear camera C3 images toward the rear of the vehicle body 2 and captures images including the surrounding environment of the work vehicle 1. The optical axis of the rear camera C3 is oriented toward the rear as indicated by arrow A3 in FIG. 4.

The first side camera C2 is attached to one side portion of the vehicle body 2. The second side camera C4 is attached to the other side portion of the vehicle body 2. In the present embodiment, the first side camera C2 is attached a left side portion of the vehicle body 2, and the second side camera C4 is attached a right side portion of the vehicle body 2. However, the first side camera C2 may be attached the right side portion of the vehicle body 2, and the second side camera C4 may be attached the left side portion of the vehicle body 2.

The first side camera C2 images toward the left of the vehicle body 2 and captures images including the surrounding environment of the work vehicle 1. The second side camera C4 images toward the right of the vehicle body 2 and captures images including the surrounding environment of the work vehicle 1. The first side camera C2 is attached to a position forward of the second side camera C4.

The optical axis of the first side camera C2 is inclined toward the rear with respect to the left-right direction of the vehicle as seen in a plan view as indicated by arrow A2. The optical axis A2 of the first side camera C2 is oriented diagonally rearward and to the left. The optical axis of the second side camera C4 is inclined toward the front with respect to the left-right direction of the vehicle as seen in a plan view as indicated by arrow A4. The optical axis A4 of the second side camera C4 is oriented diagonally forward and to the right.

A_c1 in FIG. 4 indicates the field of view of the front camera C1. A_c2 indicates the field of view of the first side camera C2. A_c3 indicates the field of view of the rear camera C3. A_c4 indicates the field of view of the second side camera C4. The field of view of the front camera C1 and the field of view of the first side camera C2 overlap at A_c1,c2. The field of view of the first side camera C2 and the field of view of the rear camera C3 overlap at A_c2,c3. The field of view of the rear camera C3 and the field of view of the second side camera C4 overlap at A_c3,c4. The field of view of the front camera C1 and the field of view of the second side camera C4 overlap at A_c1,c4.

Figure 5:
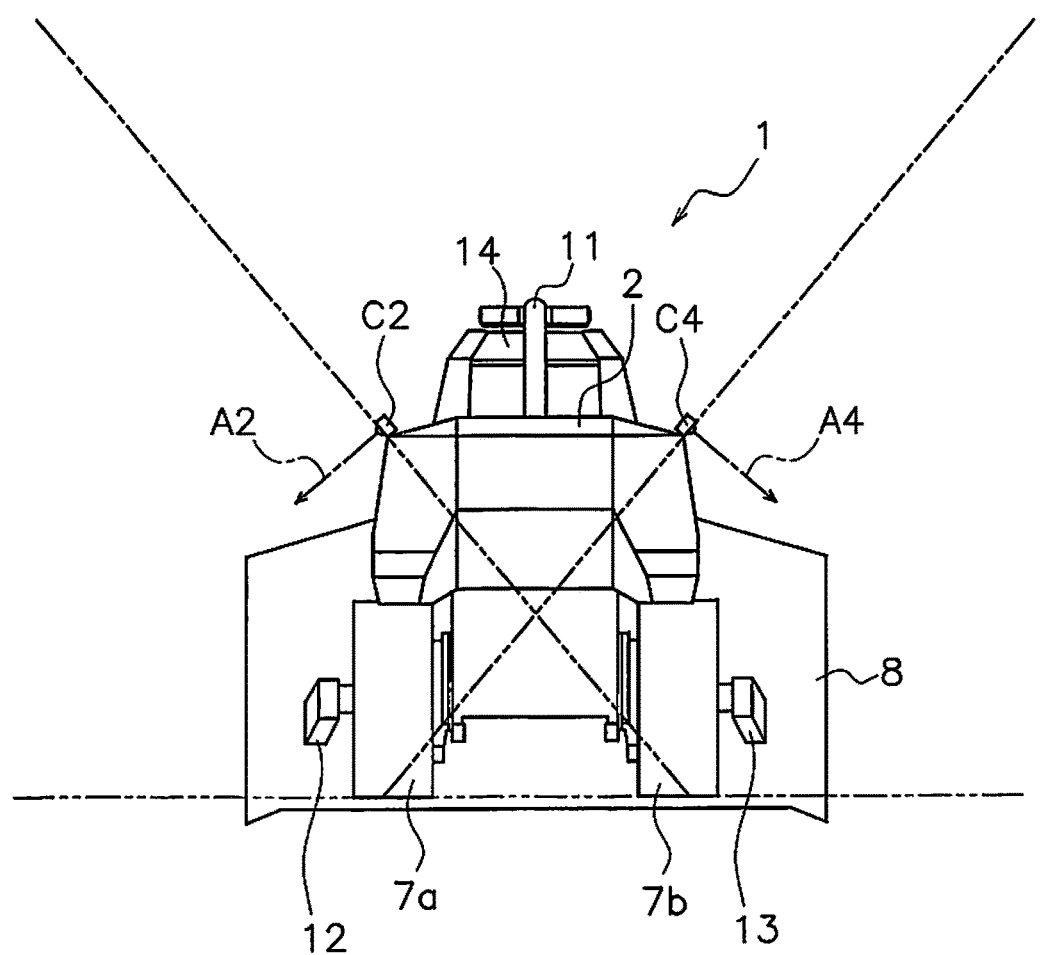
FIG. 5 is a rear view indicating the fields of view and the dispositions of a first side camera and a second side camera.

FIG. 5 is a rear view indicating the fields of view and the dispositions of the first side camera C2 and the second side camera C4. As illustrated in FIG. 5, the optical axis A2 of the first side camera C2 is inclined downward with respect to the horizontal direction. Therefore, the images captured by the first side camera C2 include the surrounding environment of the work vehicle 1 and a first vehicle body portion which indicates at least a portion of the work vehicle 1. The first vehicle body portion includes the crawler belt 7a of the left travel device 4a and the left side surface of the vehicle body 2. The first vehicle body portion includes at least a portion of the vehicle body 2. The first vehicle body portion includes at least a portion of the left travel device 4a. The first vehicle body portion includes at least a portion of the left side surface of the vehicle body 2.

The optical axis A4 of the second side camera C4 is inclined downward with respect to the horizontal direction in the same way as the first side camera C2. Therefore, the images captured by the second side camera C4 include the surrounding environment of the work vehicle 1 and a second vehicle body portion which indicates at least a portion of the work vehicle 1. The second vehicle body portion includes the crawler belt 7b of the right travel device 4b and the right side surface of the vehicle body 2. The second vehicle body portion includes at least a portion of the vehicle body 2. The second vehicle body portion includes at least a portion of the right travel device 4b. The second vehicle body portion includes at least a portion of the right side surface of the vehicle body 2.

In the present embodiment, the angles of view of the optical axes A2 and A4 of the respective first side camera C2 and the second side camera C4 are inclined downward 40 degrees with respect to the horizontal direction. However, the angles of view of the optical axes A2 and A4 of the respective first side camera C2 and the second side camera C4 are not limited to 40 degrees and may be changed. The angles of view with respect to the horizontal direction of the optical axes A2 and A4 of the respective first side camera C2 and the second side camera C4 are preferably between 15 degrees and 45 degrees inclusive. The angles of view with respect to the horizontal direction of the optical axes A2 and A4 of the respective first side camera C2 and the second side camera C4 may be outside of the above range.

The optical axes A1 and A3 of the respective front camera C1 and the rear camera C3 are inclined downward with respect to the horizontal direction. Therefore, the images captured by the front camera C1 include the surrounding environment of the work vehicle 1 and a front vehicle body portion which indicates a front portion of the work vehicle 1. For example, the front vehicle body portion includes the blade 8. The images captured by the rear camera C3 include the surrounding environment of the work vehicle 1 and a rear vehicle body portion which indicates a rear portion of the work vehicle 1. For example, the rear vehicle body portion includes the rear surface of the vehicle body 2. Alternatively, the rear vehicle body portion may include the ripper device 6.

The angles of view with respect to the horizontal direction of the optical axes A1 and A3 of the respective front camera C1 and the rear camera C3 are smaller than the angles of view with respect to the horizontal direction of the optical axes A2 and A4 of the respective first side camera C2 and the second side camera C4. For example, the angles of view with respect to the horizontal direction of the optical axes A1 and A3 of the front camera C1 and the rear camera C3 are 20 degrees.

As illustrated in FIG. 3, the display system 20 includes a controller 21 and a display device 22. The cameras C1-C4 are configured to communicate with the controller 21 by wire or wirelessly. The cameras C1-C4 send the captured image data to the controller 21.

The controller 21 is programmed to generate a display image Is for displaying the surrounding environment of the work vehicle 1 on the basis of the image data imaged by the cameras C1-C4. The controller 21 may be disposed outside the work vehicle 1. Alternatively, the controller 21 may be disposed inside the work vehicle 1. The controller 21 includes a communication device 23, a computation device 24, and a storage device 25.

The communication device 23 communicates with the cameras C1-C4 by wire or wirelessly. The communication device 23 obtains the image data from the cameras C1-C4.

The computation device 24 is configured with a processing device such as a CPU. The computation device 24 generates the display image Is from the images captured by the cameras C1-C4. The generation of the display image Is is explained below.

The storage device 25 is configured with a memory such as a RAM or a ROM, or with an auxiliary storage device 25 such as a hard disk. The storage device 25 stores the image data from the cameras C1-C4. The storage device 25 stores various types of data and programs used for generating the display image Is.

The display device 22 is configured with a display such as a CRT, and an LCD, or an OELD. However, the display device 22 is not limited to the aforementioned displays and may be another type of display. The display device 22 displays the display image Is on the basis of an output signal from the computation device 24.

The generation of the display image Is will be explained in greater detail next. First, imaging is performed by the cameras C1-C4. The communication device 23 obtains a forward image Im1, a leftward image Im2, a rearward image Im3, and a rightward image Im4 from the cameras C1-C4. The forward image Im1 is an image in the forward direction of the vehicle body 2. The leftward image Im2 is an image in the leftward direction of the vehicle body 2. The rearward image Im3 is an image in the rearward direction of the vehicle body 2. The rightward image Im4 is an image in the rightward direction of the vehicle body 2.

The computation device 24 generates a surroundings composite image Is1 from the images Im1-Im4 captured by the cameras C1-C4. The surroundings composite image Is1 is an image which depicts the surroundings of the work vehicle 1 in a bird's-eye view manner. The computation device 24 generates the surroundings composite image Is1 by projecting the images captured by the cameras C1-C4 onto a projection plane of the surrounding environment.

Figure 6:
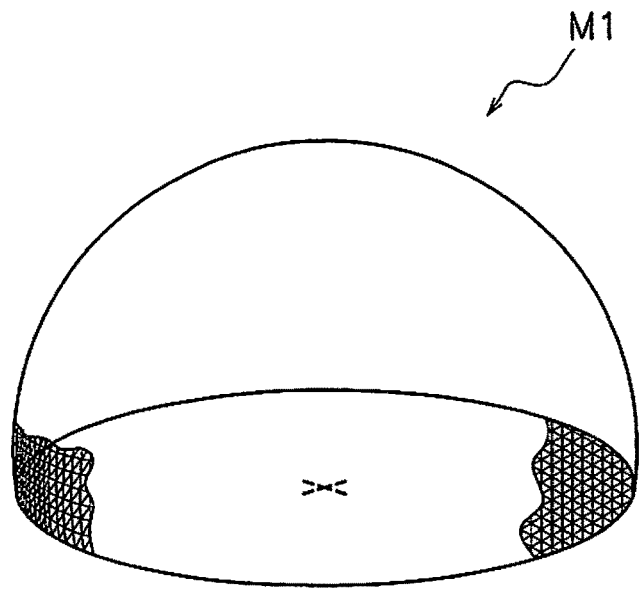
FIG. 6 illustrates an example of a projection plane for a surroundings composite image.

FIG. 6 illustrates an example of a projection plane M1 for the surrounding environment. As illustrated in FIG. 6, the projection plane M1 for the surrounding environment is a hemispherical three-dimensional mesh model. Only a portion of the mesh structure of the projection plane M1 for the surrounding environment is illustrated in FIG. 6. The data of the projection plane M1 for the surrounding environment is stored in the storage device 25. The computation device 24 generates the surroundings composite image Is1 by projecting the images Im1-Im4 captured by the cameras C1-C4 onto the projection plane M1 for the surrounding environment by texture mapping.

The computation device 24 generates a vehicle composite image Is2 from the images Im1-Im4 captured by the cameras C1-C4. The vehicle composite image Is2 is an image depicting the work vehicle 1 itself in a three-dimensional manner. The computation device 24 generates a vehicle composite image Is2 by projecting the images captured by the cameras C1-C4 onto a vehicle model M2.

Figure 7:
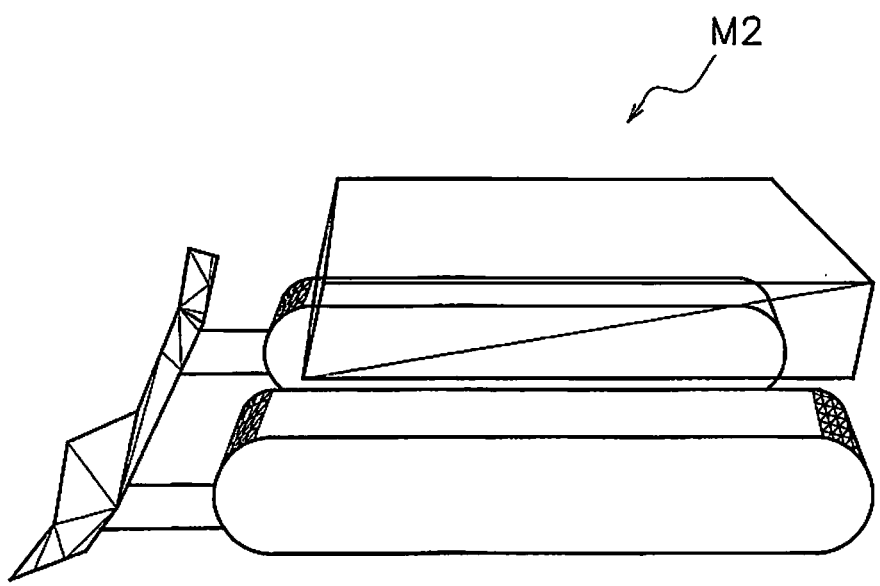
FIG. 7 illustrates an example of a vehicle model.

FIG. 7 illustrates an example of the vehicle model M2. As illustrated in FIG. 7, the vehicle model M2 is a three-dimensional mesh model having the shape of the work vehicle 1. Only a portion of the mesh structure of the vehicle composite image Is2 is illustrated in FIG. 7. The data of the vehicle model M2 is stored in the storage device 25. The computation device 24 generates the vehicle composite image Is2 by projecting the images Im1-Im4 captured by the cameras C1-C4 onto the vehicle model M2 by texture mapping. That is, the vehicle composite image Is2 is generated by combining the image of the front vehicle body portion captured by the front camera C1, the first vehicle body portion captured by the first side camera C2, the image of the rear vehicle body portion captured by the rear camera C3, and the image of the second vehicle body portion captured by the second side camera C4, onto the vehicle model M2. The vehicle model M2 may not be an independent three-dimensional mesh model and may be included at a corresponding position in the aforementioned hemispherical three-dimensional mesh model.

The method described in "Spatio-temporal bird's-eye view images using multiple fish-eye cameras," (Proceedings of the 2013 IEEE/SICE International Symposium on System Integration, pp. 753-758, 2013) for example, may be used as a specific method for combining the images. The method described in "Visualization of the surrounding environment and operational portion in a 3DCG model for the teleoperation of construction machines" (Proceedings of the 2015 IEEE/SICE International Symposium on System Integration, pp. 81-87, 2015) may also be used.

Figure 8:
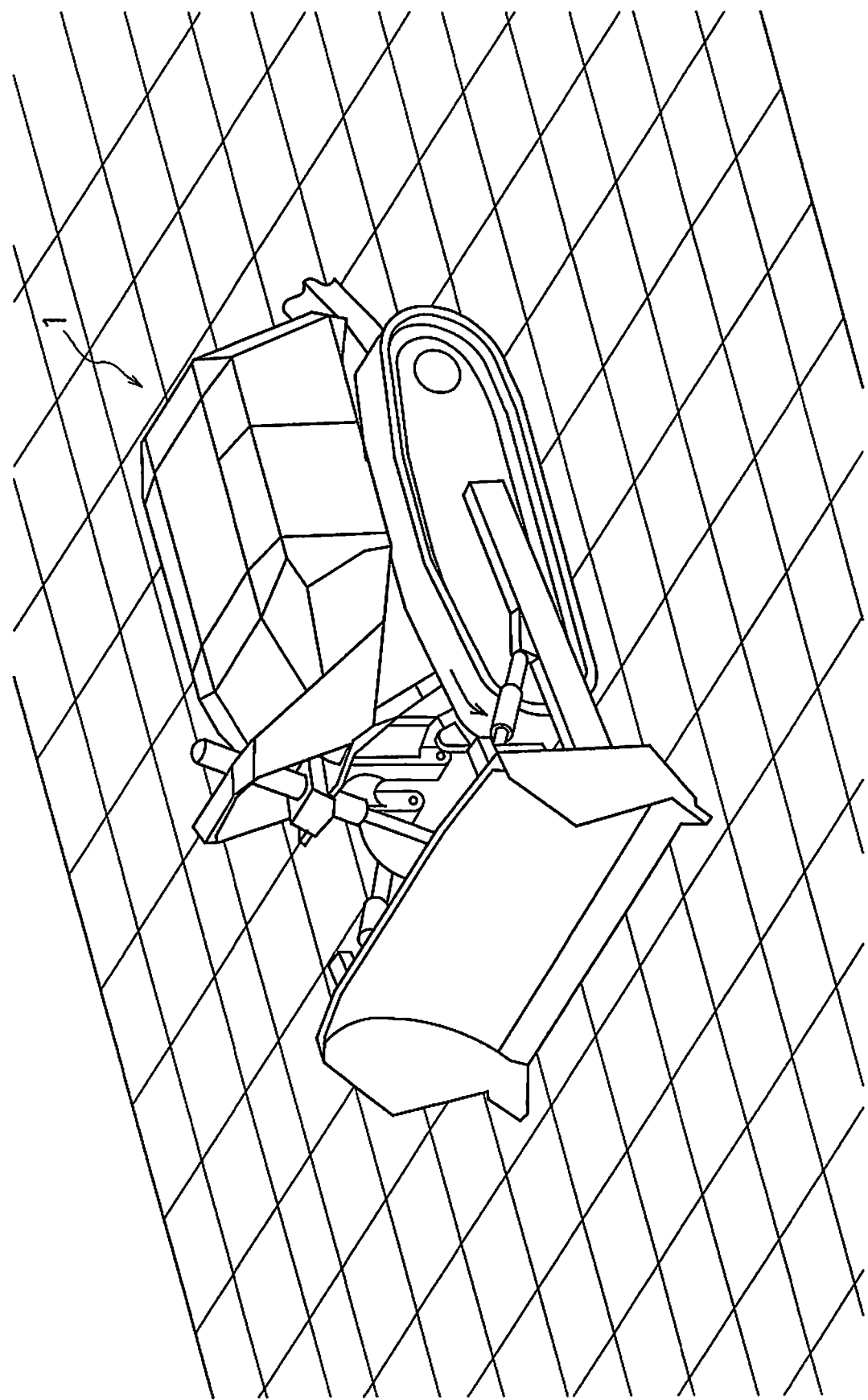
FIG. 8 is a perspective view illustrating actual conditions of the work vehicle.
Figure 9:
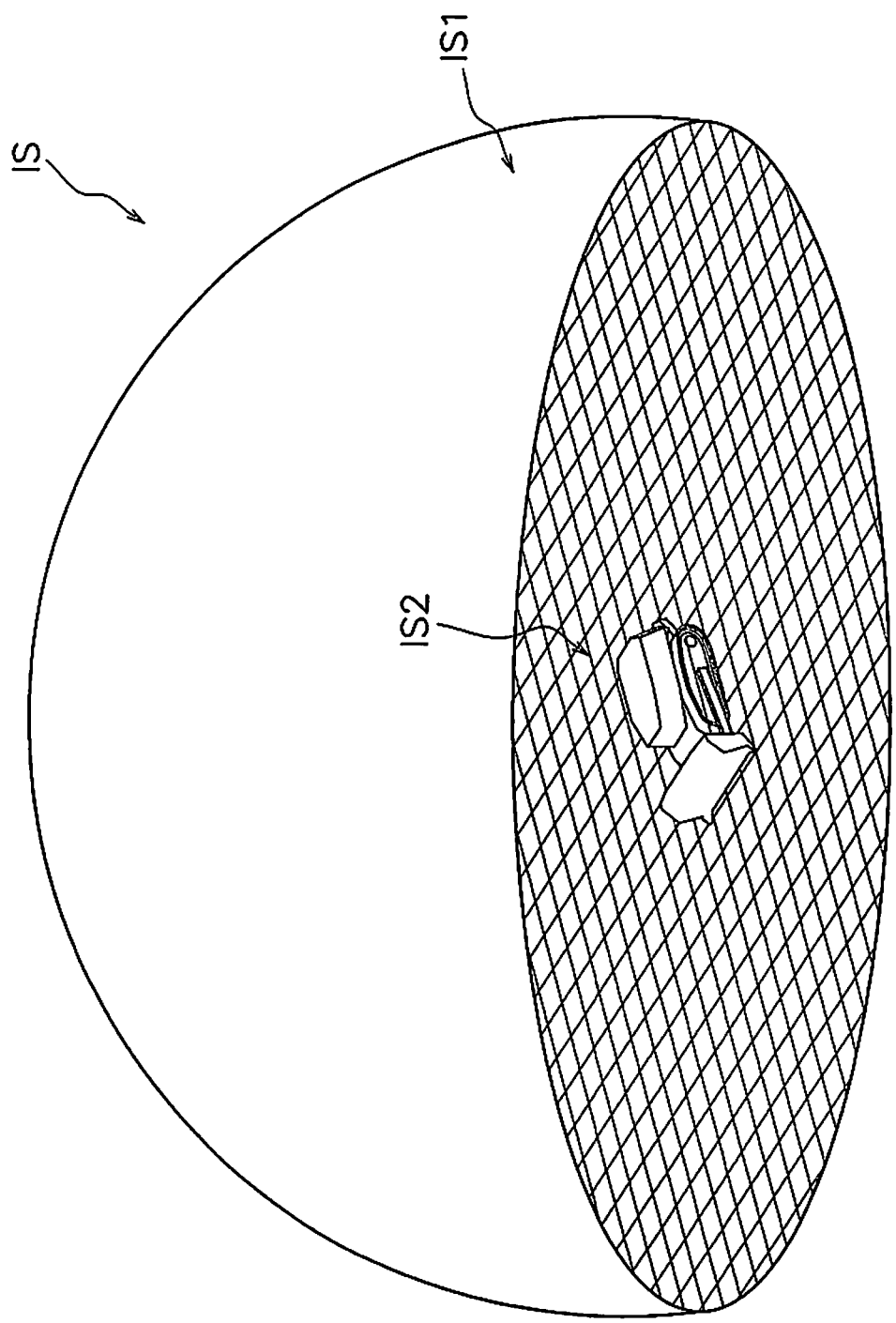
FIG. 9 is a perspective view indicating an example of a combined display image.

The display device 22 displays the display image Is. FIG. 8 is a perspective view illustrating actual conditions of the work vehicle 1. FIG. 9 illustrates an example of the display image Is. As illustrated in FIG. 9, the display image Is displays the work vehicle 1 and the surroundings thereof in a three-dimensional manner as seen diagonally from above. The display image Is displays the work vehicle 1 and the surroundings thereof as seen diagonally from in front and from the left. The display image Is is able to display the work vehicle 1 and the surroundings thereof as seen diagonally from in front and from the right. The display image Is is able to display the work vehicle 1 and the surroundings thereof as seen diagonally from the rear and from the left. Moreover, the display image Is is able to display the work vehicle 1 and the surroundings thereof as seen diagonally from the rear and from the right.

The display image Is is updated in real time and displayed as a moving image. The display image Is includes the surroundings composite image Is1 and the vehicle composite image Is2 generated as described above. Specifically, the surrounding environment of the work vehicle 1 captured by the cameras C1-C4 is displayed in the display image Is as the surroundings composite image Is1 in the surroundings of the vehicle model M2.

Figure 10:
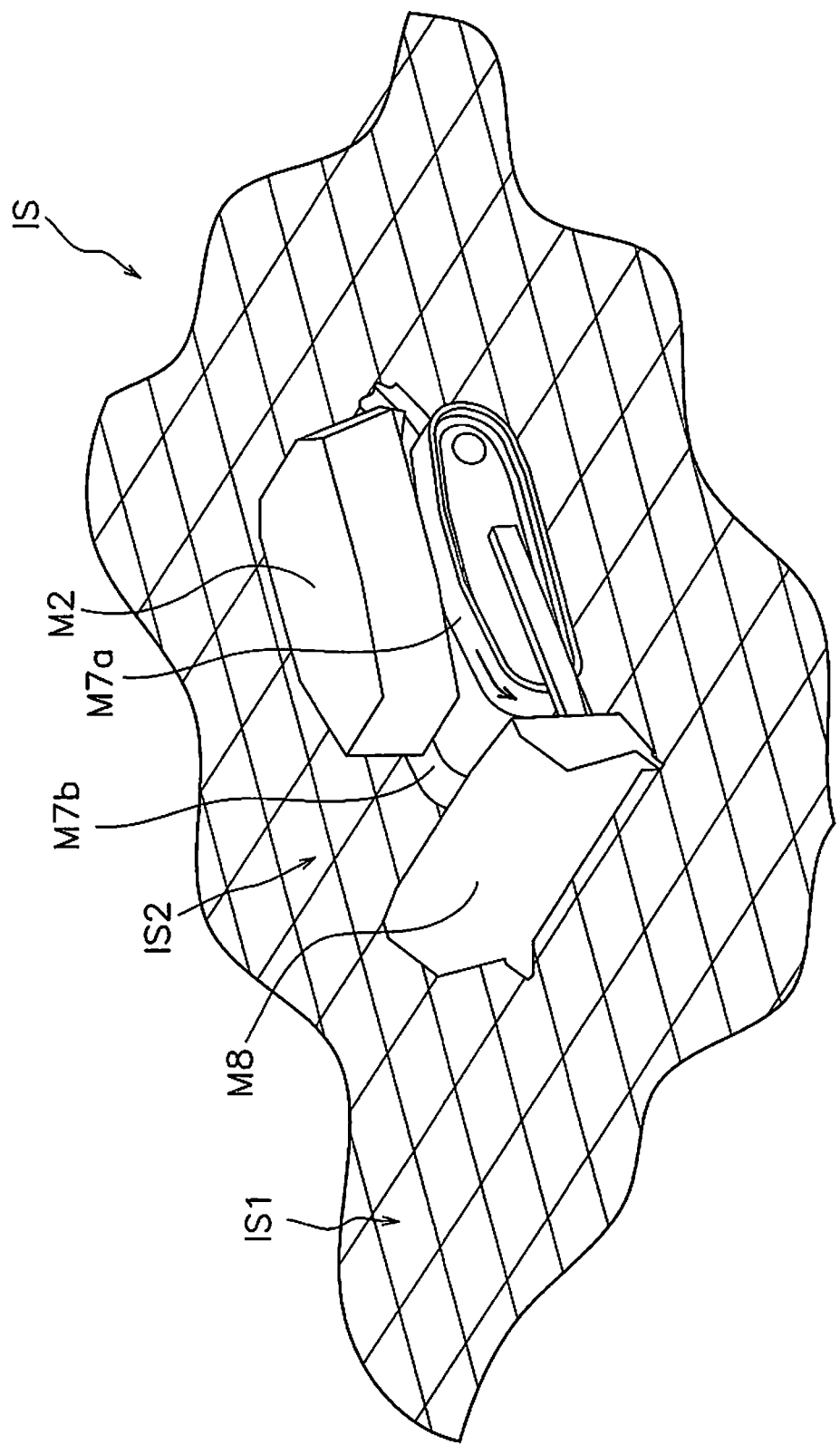
FIG. 10 is an enlarged view of the display image.

Moreover, the images of the vehicle body portions captured by the cameras C1-C4 are displayed on the vehicle model M2 as the vehicle composite image Is2. FIG. 10 is an enlarged view of the display image Is. As illustrated in FIG. 10, the image of the first vehicle body portion captured by the first side camera C2 is synthesized onto a left crawler belt M7a of the vehicle model M2. Consequently, the actual state of the crawler belt 7a is displayed on the crawler belt 7a of the vehicle model M2. Consequently, the movement of the crawler belt 7a can be understood from the vehicle model M2 in the display image Is. Furthermore, the actual state of the left side surface of the vehicle body 2 is displayed on the left side surface of the vehicle model M2. Consequently, the actual state of the left side surface of the vehicle body 2 can be understood from the vehicle model M2 in the display image Is.

The image of the second vehicle body portion captured by the second side camera C4 is synthesized onto a right crawler belt M7b of the vehicle model M2. As a result, the actual states of the right crawler belt 7b and the right side surface of the vehicle body 2 are displayed on the vehicle model M2. Moreover, the image of the front vehicle body portion captured by the front camera C1 is synthesized on a blade M8 of the vehicle model M2. As a result, the actual state of the blade 8 is displayed on the blade M8 of the vehicle model M2. The image of the rear vehicle body portion captured by the rear camera C3 is synthesized on the rear portion of the vehicle model M2. As a result, the actual state of the rear portion of the work vehicle 1 is displayed on the rear portion of the vehicle model M2.

The display image Is that includes the surroundings composite image Is1 which depicts the surrounding environment of the work vehicle 1 in a bird's-eye view manner, is generated from the images captured by the cameras C1-C4 in the display system 20 of the work vehicle 1 according to the present embodiment. As a result, the surrounding environment of the work vehicle 1 can be easily understood from the display image Is.

Moreover, the optical axes A1-A4 of the cameras C1-C4 are inclined downward with respect to the horizontal direction. As a result, images in which portions of the work vehicle 1 itself are clearly seen can be captured by the cameras C1-C4. Moreover, the images of the vehicle body portions captured by the cameras C1-C4 are displayed in the display image Is as the vehicle composite image Is2. As a result, the actual conditions of the work vehicle 1 can be easily understood from the display image Is.

In particular, the images of the crawler belt 7a captured by the first side camera C2 are displayed in the display image Is as the vehicle composite image Is2. As a result, the conditions of the crawler belt 7a, such as the occurrence of track slippage and the like, can be easily understood from the display image Is. Moreover, the images of the side surface of the vehicle body 2 captured by the first side camera C2 are displayed in the display image Is as the vehicle composite image Is2. As a result, the conditions of the side surfaces of the vehicle body 2, such as the presence of a person in the vicinity of the side surface of the vehicle body 2, can be easily recognized from the display image Is.

Moreover, the same effect can be achieved from the images of the crawler belt 7b and the side surface of the vehicle body 2 captured by the second side camera C4 in the same way as the first side camera C2.

While an embodiment of the present invention has been described above, the present invention is not limited to the embodiment and the following modifications may be made within the scope of the present invention.

The work vehicle 1 is not limited to a bulldozer, and may be another type of work vehicle such as a wheel loader, a hydraulic excavator, and a dump truck and the like. The work vehicle 1 may be a vehicle operated remotely by a controller disposed outside of the work vehicle 1. Alternatively, the work vehicle 1 may be a vehicle operated directly by an operator inside an operating cab mounted on the work vehicle 1.

The projection plane M1 for the surrounding environment is not limited to a hemisphere and may have a different shape. The vehicle model M2 is not limited to the shape illustrated in FIG. 7 and may have a different shape.

The number of the cameras is not limited to four and may be three or less or five or more. The cameras are not limited to fish-eye lens cameras and may be a different type of camera.

The first vehicle body portion and the second vehicle body portion are not limited to the crawler belts and may be sprocket wheels or other portions of the travel device such as track rollers. Alternatively, the first vehicle body portion and the second vehicle body portion are not limited to the travel device and may be a portion other than the travel device such as the arms 12 and 13.

Figure 11:
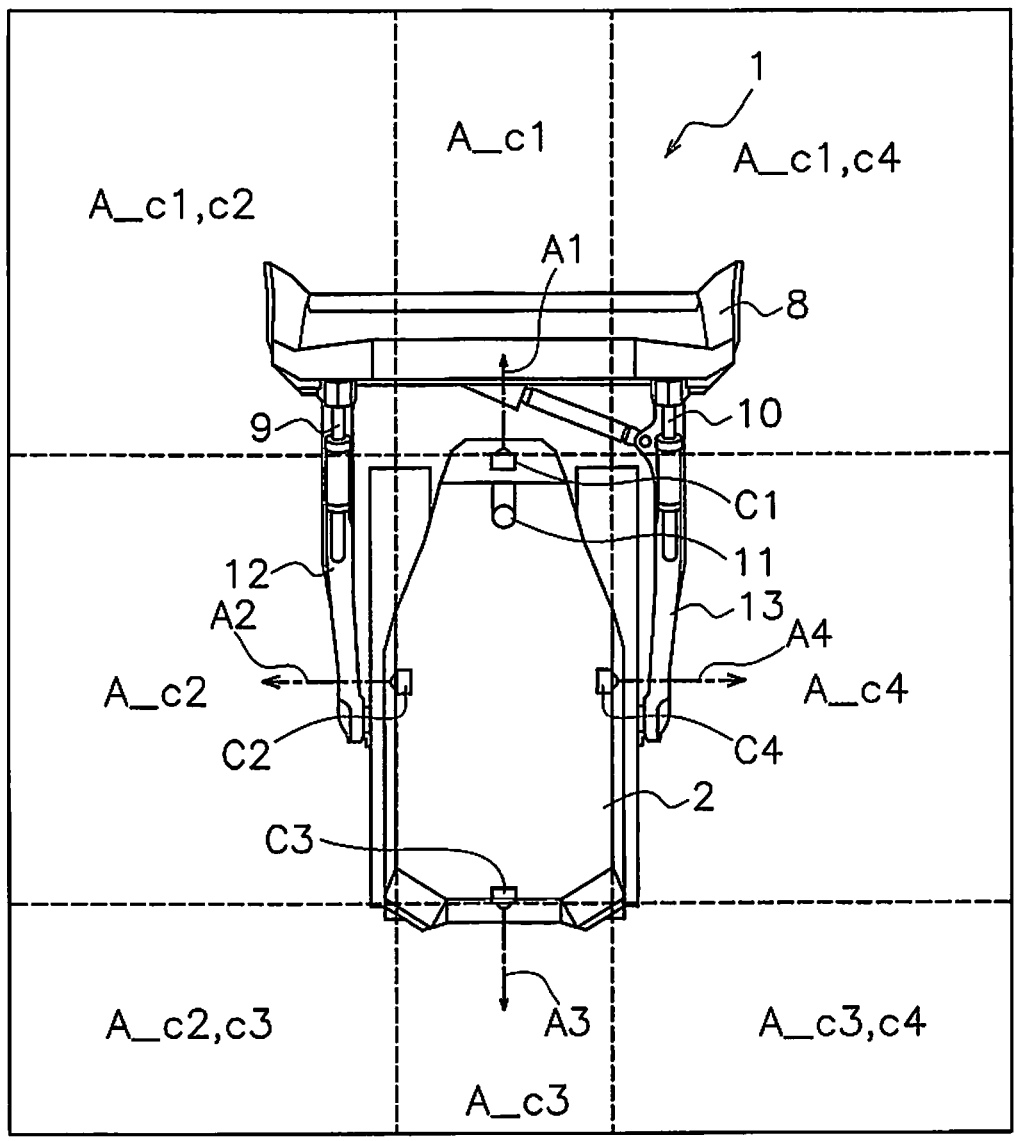
FIG. 11 is a plan view indicating the fields of view and the dispositions of cameras according to a second embodiment.

The dispositions of the cameras is not limited to the dispositions indicated in the above embodiment and may be disposed differently. FIG. 11 is a plan view indicating dispositions of the cameras C1-C4 according to a second embodiment. As illustrated in FIG. 11, the optical axes A2 and A4 of the respective first side camera C2 and the second side camera C4 are oriented in the left-right direction. The first side camera C2 and the second side camera C4 are disposed in intermediate portions of the vehicle body 2 in the vehicle front-back direction. The first side camera C2 and the second side camera C4 are disposed in an approximately symmetrical manner in the left-right direction. The dispositions of the front camera C1 and the rear camera C3 are the same as in the first embodiment. Moreover, the downward inclination angle of the cameras C1-C4 is the same as the first embodiment.

The downward inclination angle of the first side camera C2 and the second side camera C4 may be changed in response to the dispositions of the first side camera C2 and the second side camera C4. Alternatively, the downward inclination angle of the first side camera C2 and the second side camera C4 may be changed in consideration of the imaging range of the work vehicle 1 by the first side camera C2 and the second side camera C4.

Figure 12:
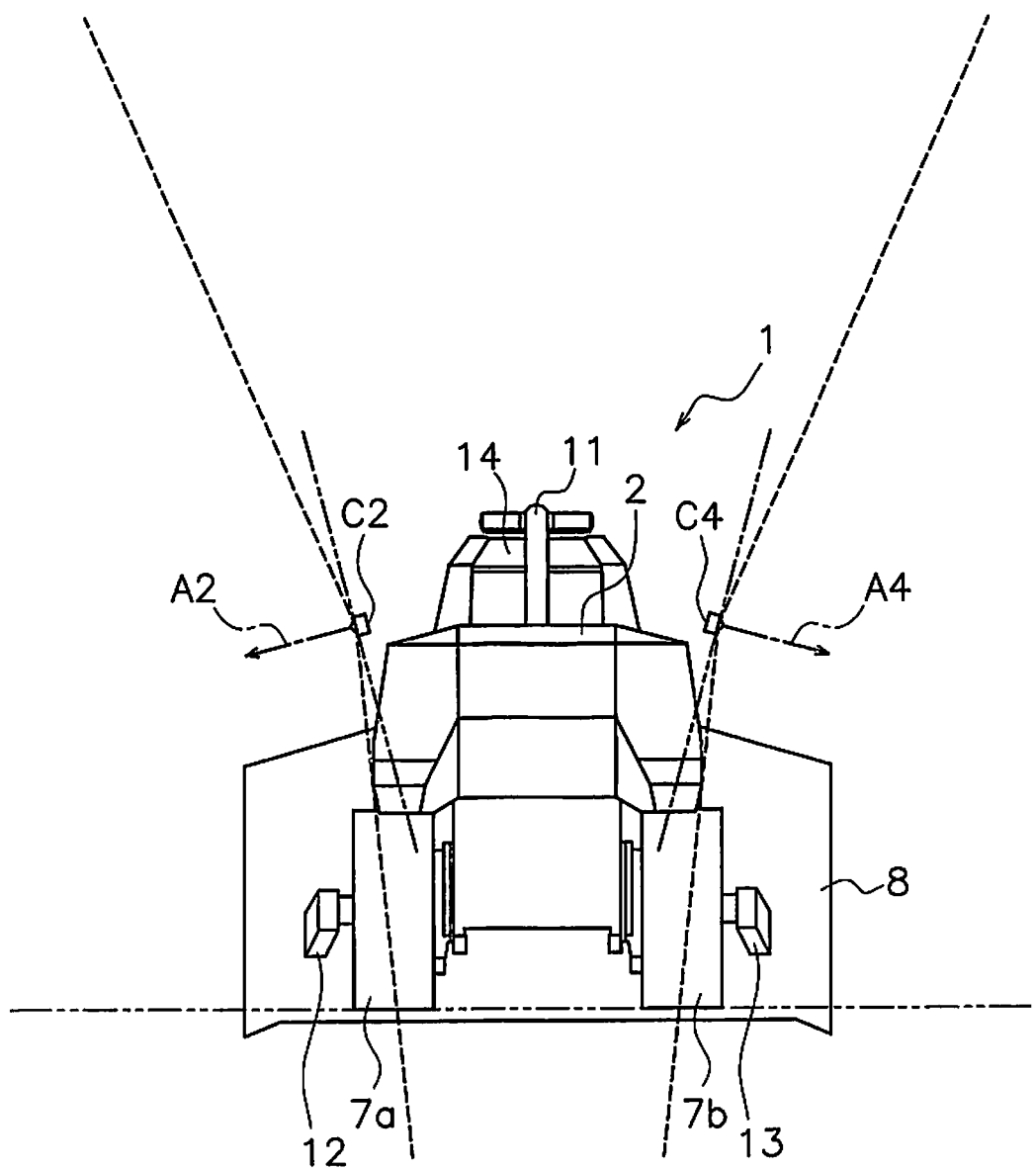
FIG. 12 is a rear view indicating the fields of view and the dispositions of a first side camera and a second side camera according to a first modified example.
Figure 13:
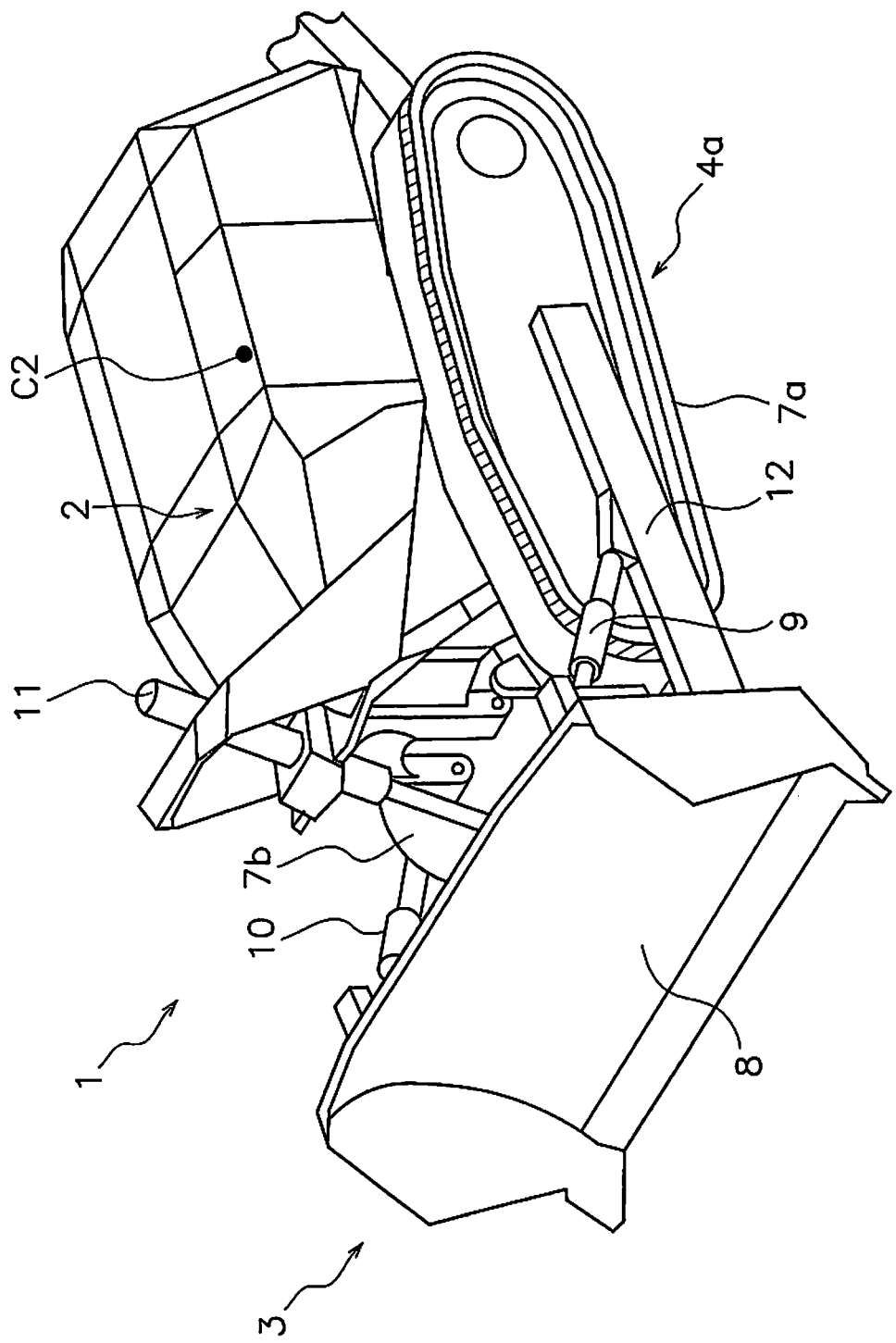
FIG. 13 is a perspective view illustrating a first vehicle body portion according to the first modified example.

For example, FIG. 12 illustrates dispositions of the first side camera C2 and the second side camera C4 according to a first modified example of the second embodiment. FIG. 13 illustrates the effective imaging range of the first side camera C2 in the first modified example. The effective imaging range is a range that is 90% of the angle of view of the first side camera C2. The dashed line in FIG. 12 depicts the effective imaging range of the first side camera C2. The hatching in FIG. 13 depicts a portion of the work vehicle 1 that falls within the effective imaging range of the first side camera C2. If the angle of view is 180 degrees for example, the portion of the work vehicle 1 that falls within the range of an angle of view of 162 degrees of the first side camera C2 is depicted by the hatching in FIG. 13.

As illustrated in FIG. 12, the first side camera C2 is disposed at a height that is approximately equal to the upper surface of the vehicle body 2 and directly above the left side surface of the vehicle body 2. The first side camera C2 is disposed directly above the crawler belt 7a. That is, the first side camera C2 overlaps the crawler belt 7a as seen in a plan view. The inclination angle of the optical axis A2 of the first side camera C2 in the first modified example is 15 degrees downward with respect to the horizontal direction. In this case, only the outside edge in the left-right direction of the upper surface of the crawler belt 7a falls within the effective imaging range of the first side camera C2 as depicted by the hatching in FIG. 13.

Figure 14:
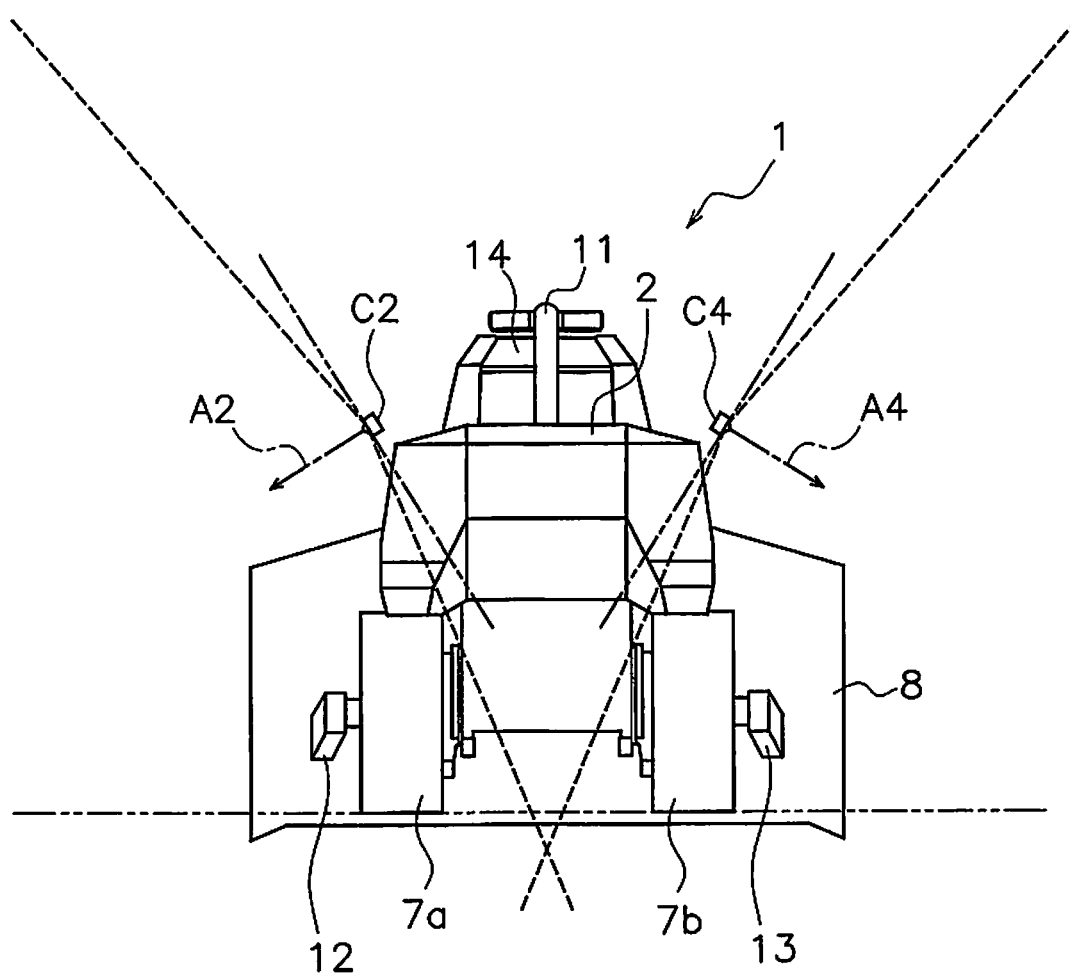
FIG. 14 is a rear view indicating the fields of view and the dispositions of the first side camera and the second side camera according to a second modified example.
Figure 15:
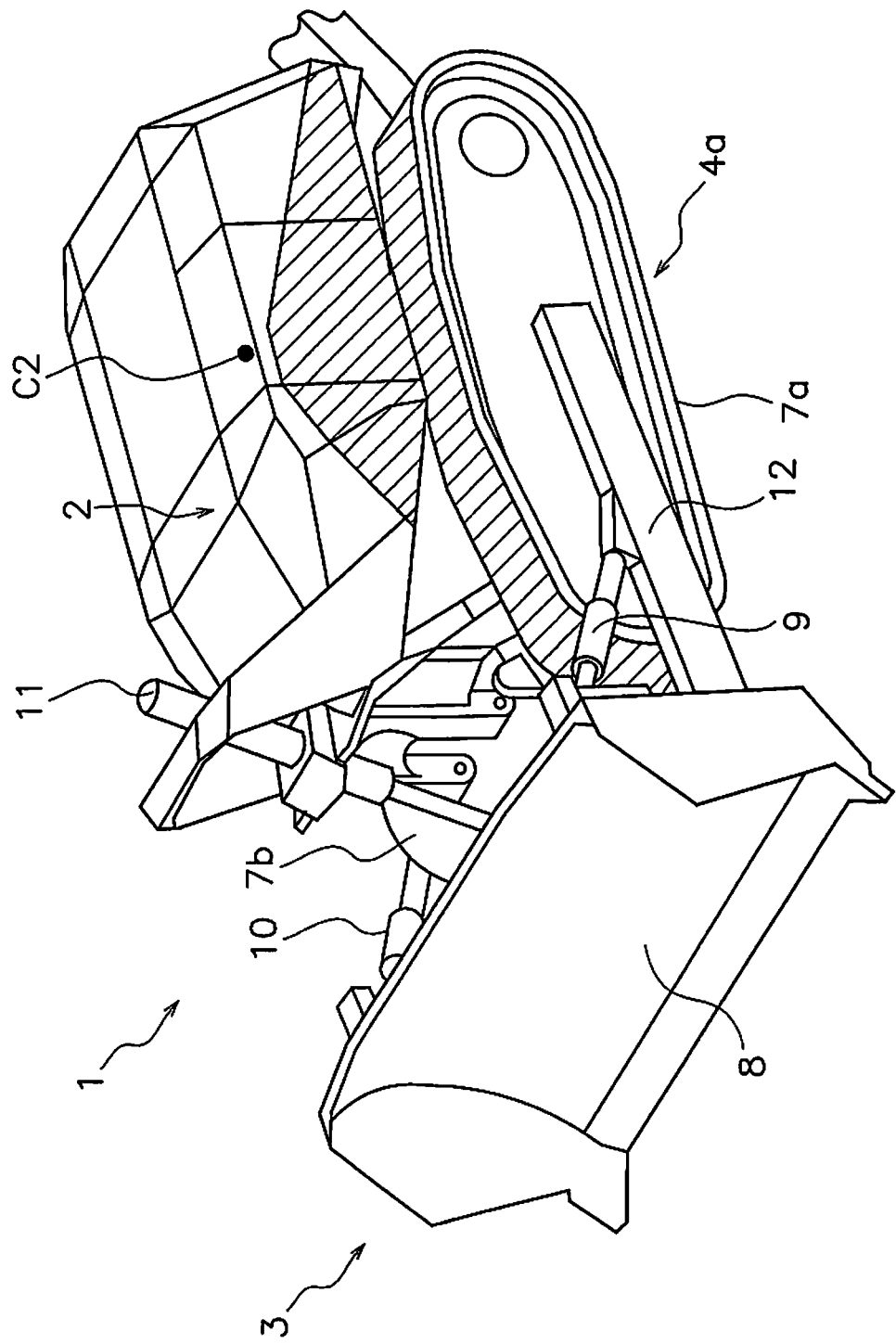
FIG. 15 is a perspective view illustrating the first vehicle body portion according to the second modified example.

FIG. 14 illustrates dispositions of the first side camera C2 and the second side camera C4 according to a second modified example of the second embodiment. FIG. 15 illustrates the effective imaging range of the first side camera C2 in the second modified example. As illustrated in FIG. 14, the first side camera C2 is disposed at a height that is approximately equal to the upper surface of the vehicle body 2 and directly above the left side surface of the vehicle body 2 in the same way as in the first modified example. The inclination angle of the optical axis A2 of the first side camera C2 in the second modified example is 32 degrees downward with respect to the horizontal direction. In this case, the entire width in the left-right direction of the upper surface of the crawler belt 7a falls within the effective imaging range of the first side camera C2 as depicted by the hatching in FIG. 15. As a result, in particular the entire width in the left-right direction of the front edge of the crawler belt 7a is included in the vehicle composite image Is2 as the first vehicle body portion, and consequently, the state of the crawler belt 7a can be understood effectively. Moreover, a portion of the side surface of the vehicle body 2 falls within the effective imaging range of the first side camera C2. Consequently, the state of the side surface of the vehicle body 2 can be understood effectively.

Figure 16:
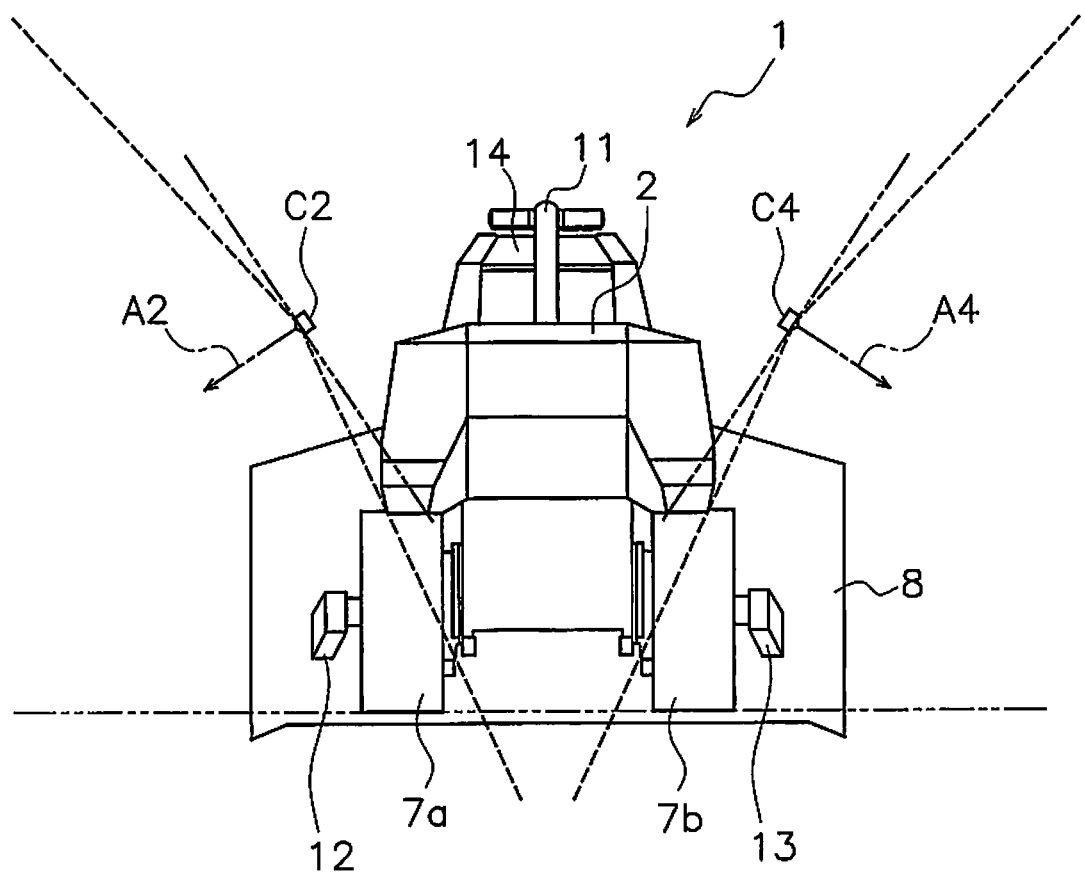
FIG. 16 is a rear view indicating the fields of view and the dispositions of the first side camera and the second side camera according to a third modified example.
Figure 17:
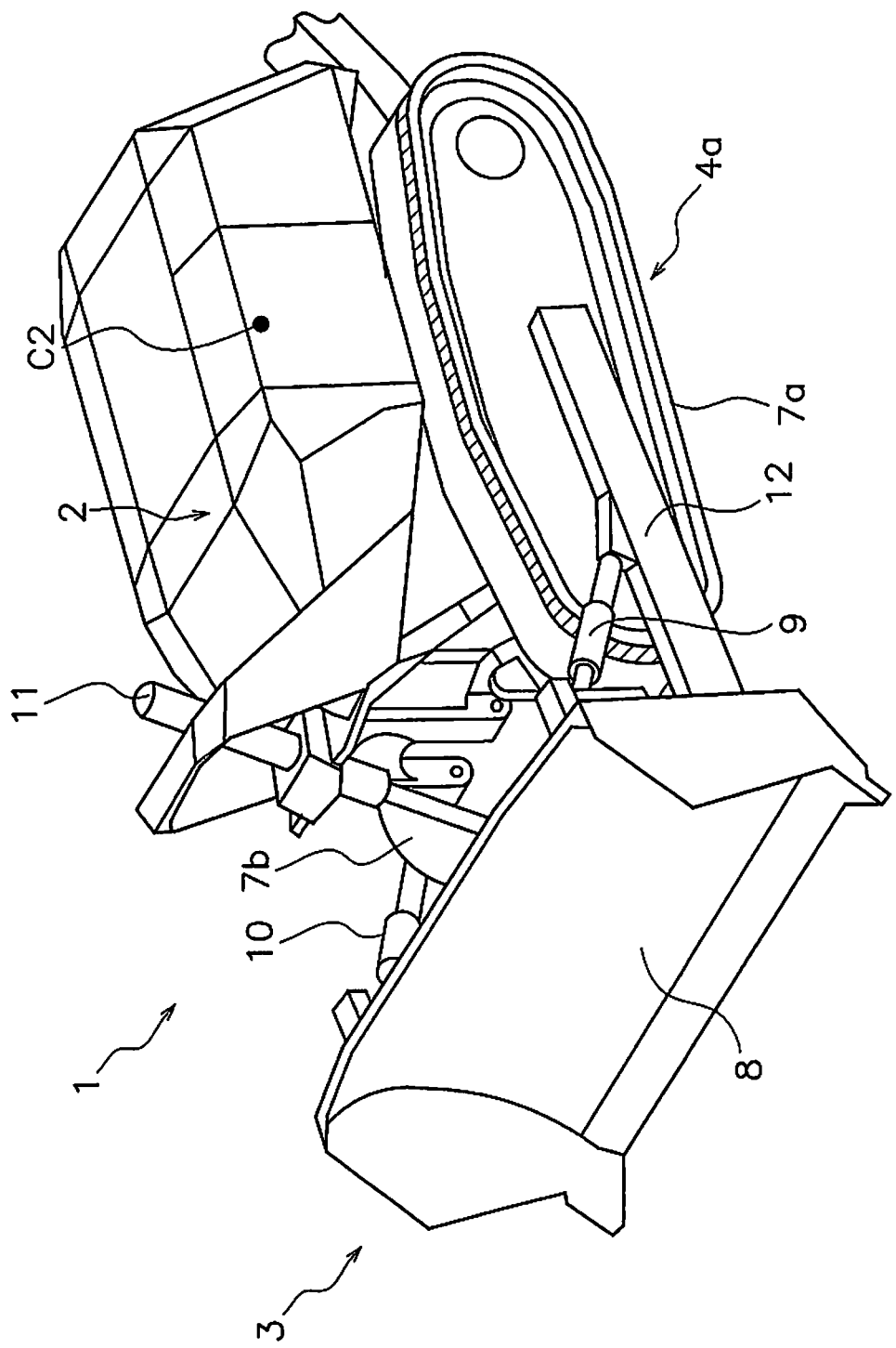
FIG. 17 is a perspective view illustrating the first vehicle body portion according to the third modified example.

FIG. 16 illustrates dispositions of the first side camera C2 and the second side camera C4 according to a third modified example of the second embodiment. FIG. 17 illustrates the effective imaging range of the first side camera C2 in the third modified example. As illustrated in FIG. 16, the first side camera C2 is disposed at a height that is approximately equal to the upper surface of the vehicle body 2, and further to the outside in the left-right direction of the vehicle than the crawler belt 7a. The first side camera C2 is disposed directly above the arm 12 as seen in a rear view of the vehicle. The inclination angle of the optical axis A2 of the first side camera C2 in the third modified example is 34 degrees downward with respect to the horizontal direction. In this case, only the outside edge in the left-right direction of the upper surface of the crawler belt 7a falls within the effective imaging range of the first side camera C2 as depicted by the hatching in FIG. 17.

Figure 18:
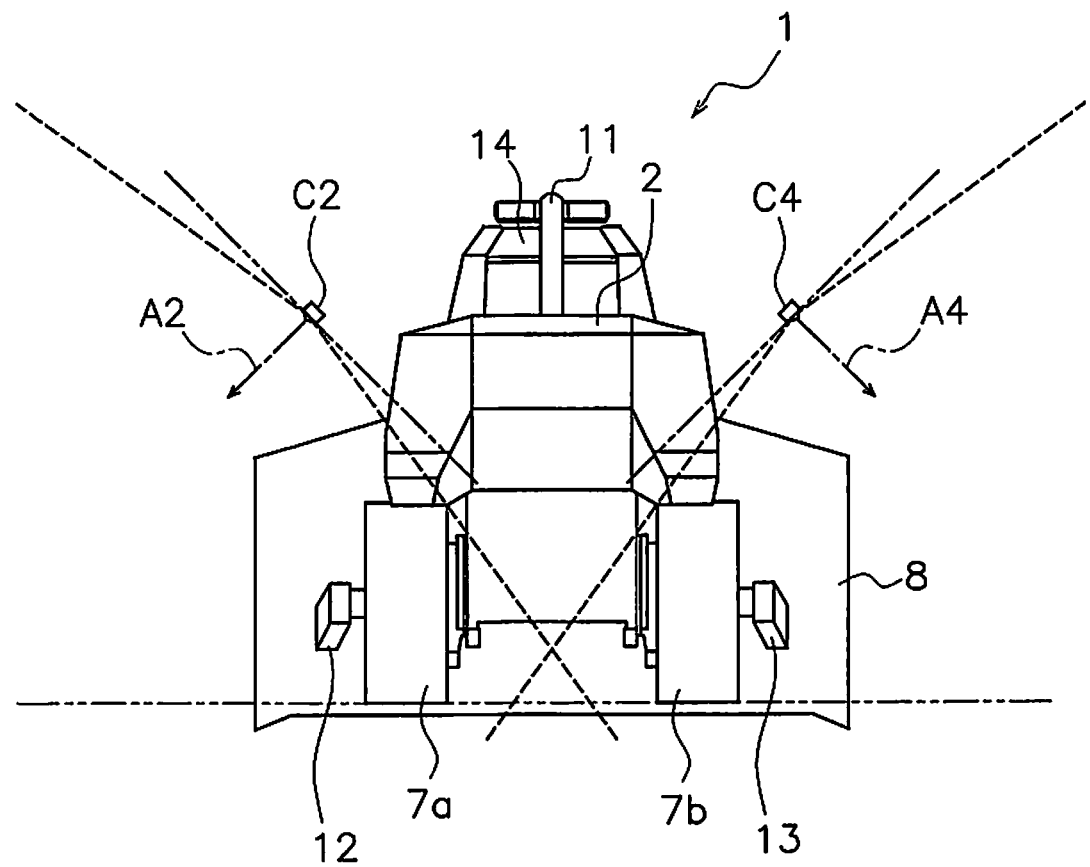
FIG. 18 is a rear view indicating the fields of view and the dispositions of the first side camera and the second side camera according to a fourth modified example.
Figure 19:
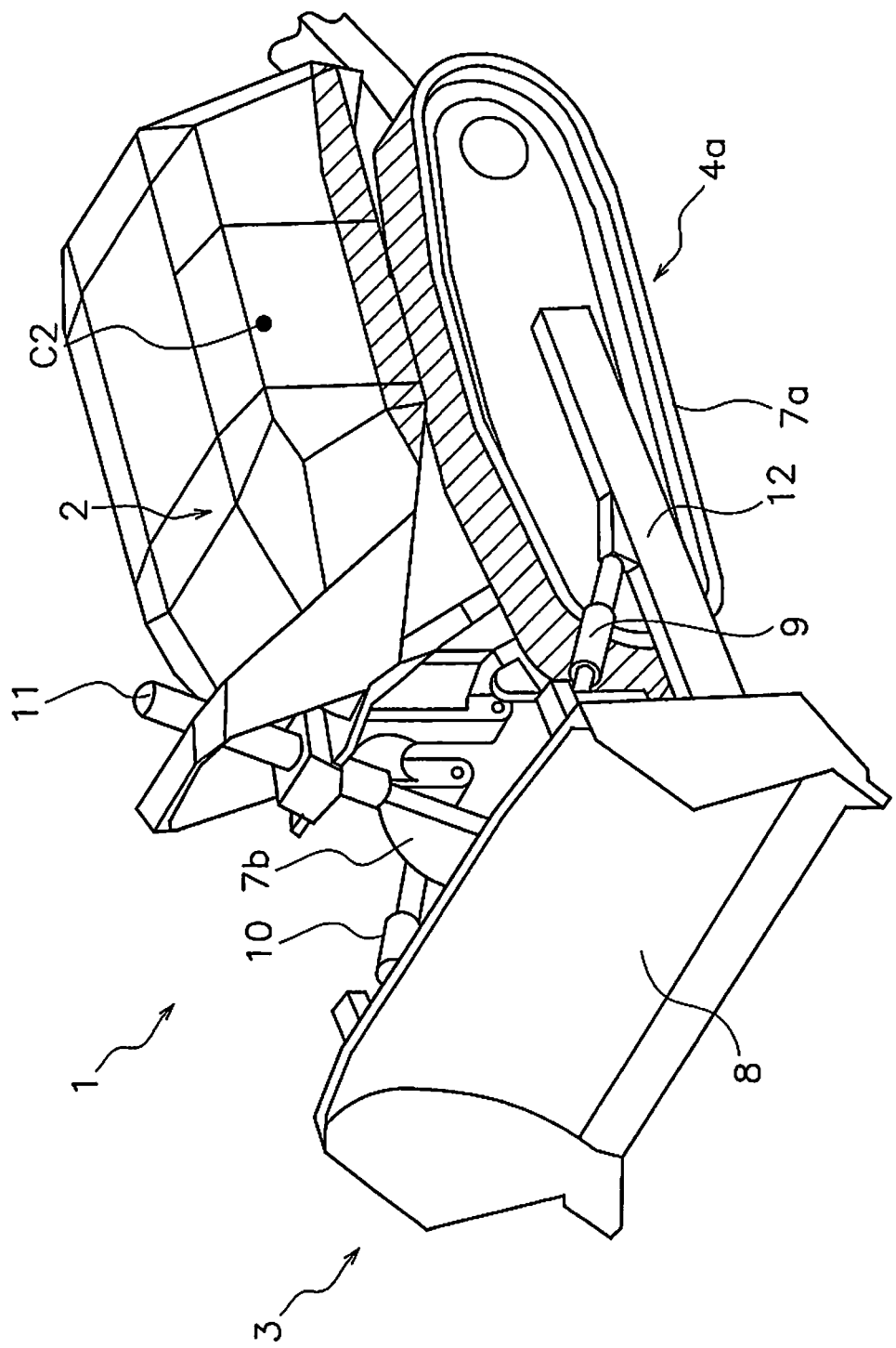
FIG. 19 is a perspective view illustrating the first vehicle body portion according to the fourth modified example.

FIG. 18 illustrates dispositions of the first side camera C2 and the second side camera C4 according to a fourth modified example of the second embodiment. FIG. 19 illustrates the effective imaging range of the first side camera C2 in the fourth modified example. As illustrated in FIG. 18, the first side camera C2 is disposed at a height that is approximately equal to the upper surface of the vehicle body 2, and further to the outside in the left-right direction of the vehicle than the crawler belt 7a in the same way as in the third modified example. In this case, the entire width in the left-right direction of the upper surface of the crawler belt 7a falls within the effective imaging range of the first side camera C2 as depicted by the hatching in FIG. 19. Moreover, a portion of the side surface of the vehicle body 2 falls within the effective imaging range of the first side camera C2.

The first side camera C2 and the second side camera C4 are disposed so as to be spaced away from the upper surface of the vehicle body 2 in the abovementioned first to fourth modified examples. Therefore, the first side camera C2 and the second side camera C4 may be attached to the vehicle body 1 via a bracket. Alternatively, a portion of the vehicle body 2 may be extended, and the first side camera C2 and the second side camera C4 may be attached to the extended portion.

What is claimed is:
1. A display system for a work vehicle, the system comprising:
   a work vehicle having a travel device including a crawler belt;
   a first camera attached to one side portion of the work vehicle, the first camera having an optical axis that is inclined downward with respect to a horizontal direction, and the first camera being configured to capture a first image which includes a surrounding environment of the work vehicle and a first vehicle body portion including at least a portion of the crawler belt;

a computation device configured to generate, from the first image captured by the first camera, a display image including a surrounding image that depicts the surrounding environment of the work vehicle in a bird's-eye view manner, and a vehicle image formed by projecting an image of the first vehicle body portion captured by the first camera onto a vehicle model depicting the work vehicle, the display image depicting the work vehicle, the first vehicle body portion, and the surrounding environment in a perspective three-dimensional manner as seen from diagonally above and to one side the work vehicle; and a display device configured to display the display image.

2. The display system for a work vehicle according to claim 1, wherein the first vehicle body portion includes an entire width in a left-right direction of a front edge of the crawler belt.

3. The display system for a work vehicle according to claim 1, wherein the first camera is disposed outward of the travel device in a left-right direction of the vehicle.

4. The display system for a work vehicle according to claim 1, wherein the first vehicle body portion further includes one side surface of the work vehicle.

5. The display system for a work vehicle according to claim 1, wherein an angle of the optical axis of the first camera with respect to the horizontal direction is at least 15 degrees and no more than 45 degrees.

6. The display system for a work vehicle according to claim 1, wherein an angle of view of the first camera is at least 180 degrees.

7. The display system for a work vehicle according to claim 1, wherein the optical axis of the first camera is inclined in a front-back direction with respect to a left-right direction of the vehicle.

8. The display system for a work vehicle according to claim 1, the system further comprising:

a second camera attached to another side portion of the work vehicle, the second camera having an optical axis that is inclined downward with respect to the horizontal direction, and the second camera being configured to capture a second image which includes the surrounding environment of the work vehicle and a second vehicle body portion that indicates at least a portion that is different from the first vehicle body portion of the work vehicle, the computation device being further configured to generate the display image from the first image captured by the first camera and the second image captured by the second camera.

9. The display system for a work vehicle according to claim 8, wherein the first camera is disposed forward of the second camera, the optical axis of the first camera is inclined rearward with respect a left-right direction of the vehicle, and the optical axis of the second camera is inclined forward with respect to the left-right direction of the vehicle.

10. The display system for a work vehicle according to claim 8, wherein the work vehicle further includes left and right travel devices, the first vehicle body portion includes one of the left and right travel devices, and the second vehicle body portion includes the other of the left and right travel devices.

11. The display system for a work vehicle according to claim 8, the system further comprising:

a front camera attached to a front portion of the work vehicle, the front camera being configured to capture a third image that includes the surrounding environment of the work vehicle; and a rear camera attached to a rear portion of the work vehicle, the rear camera being configured to capture a fourth image that includes the surrounding environment of the work vehicle, the computation device being further configured to generate the display image from the first image, the second image, the third image and the fourth image captured by the first camera, the second camera, the front camera, and the rear camera, respectively.

12. The display system for a work vehicle according to claim 1, wherein the vehicle model is a three-dimensional mesh model having a shape corresponding to a shape of the work vehicle.

13. A display system for a work vehicle, the system comprising:

a work vehicle having a travel device including a crawler belt;

a first camera attached to one side portion of the work vehicle, the first camera having an optical axis that is inclined downward with respect to a horizontal direction, and the first camera being configured to capture a first image which includes a surrounding environment of the work vehicle and a first vehicle body portion including at least a portion of the crawler belt;

a computation device configured to generate, from the first image captured by the first camera, a display image including a surrounding image that depicts the surrounding environment of the work vehicle in a bird's-eye view, and a vehicle image that includes a body portion image of the first vehicle body portion captured by the first camera, the display image depicting the work vehicle, the first vehicle body portion, and the surrounding environment in a perspective three-dimensional manner as seen from diagonally above and to one side the work vehicle; and a display device configured to display the display image.

14. The display system for a work vehicle according to claim 13, wherein the vehicle image is the body portion image combined with a vehicle model that depicts the work vehicle.

15. The display system for a work vehicle according to claim 13, wherein the work vehicle includes a work implement and a vehicle body, and the first vehicle body portion further includes at least one side surface of the vehicle body.

16. The display system for a work vehicle according to claim 14, wherein the vehicle model is a three-dimensional mesh model having a shape corresponding to a shape of the work vehicle.

\* \* \* \* \*